United States Patent
Mayo et al.

(10) Patent No.: US 10,077,951 B2
(45) Date of Patent: Sep. 18, 2018

(54) HEAT EXCHANGER

(71) Applicant: Hamilton Sundstrand Corporation, Windsor Locks, CT (US)

(72) Inventors: Luke J. Mayo, Coventry, CT (US); Patrick McCord, Norwich, CT (US); Donald E. Army, Enfield, CT (US)

(73) Assignee: HAMILTON SUBSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 14/947,447

(22) Filed: Nov. 20, 2015

(65) Prior Publication Data
US 2017/0146303 A1    May 25, 2017

(51) Int. Cl.
| F28F 99/00 | (2006.01) |
| F28F 9/007 | (2006.01) |
| F28D 9/00 | (2006.01) |
| F28F 9/00 | (2006.01) |
| B64D 13/00 | (2006.01) |
| F28D 21/00 | (2006.01) |
| F28F 9/02 | (2006.01) |

(52) U.S. Cl.
CPC ............ *F28F 9/0075* (2013.01); *B64D 13/00* (2013.01); *F28D 9/00* (2013.01); *F28D 9/0043* (2013.01); *F28F 9/001* (2013.01); *F28D 2021/0021* (2013.01); *F28F 2009/029* (2013.01); *F28F 2280/00* (2013.01)

(58) Field of Classification Search
USPC .............. 248/346.01, 346.03, 346.4, 346.06; 165/67, 68, 149; 180/68.4
See application file for complete search history.

(56) References Cited

U.S. PATENT DOCUMENTS

| 5,678,800 | A | * | 10/1997 | Markussen | G06F 3/0395 248/118 |
| 6,079,687 | A | * | 6/2000 | Calleia | G05G 1/487 248/346.01 |
| D431,174 | S | * | 9/2000 | Merideth | D8/354 |
| 6,164,213 | A | * | 12/2000 | Topps | A47B 21/0314 108/25 |
| 6,550,741 | B1 | * | 4/2003 | Cottone | B60P 7/12 108/51.11 |
| D598,920 | S | * | 8/2009 | Fujino | D14/447 |
| 8,047,497 | B2 | * | 11/2011 | Tai | F16M 11/00 248/346.03 |
| 8,490,846 | B1 | * | 7/2013 | Wheatley | B60R 11/02 224/277 |

* cited by examiner

*Primary Examiner* — Alfred J Wujciak
(74) *Attorney, Agent, or Firm* — Cantor Colburn LLP

(57) ABSTRACT

A mount configured for use with a recirculation heat exchanger of an aircraft environmental control is provided including a rectangular base having a length of about 14 inches (35.56 cm) and a width of about 6 inches (15.24 cm). A support extends vertically from the base. A top surface of the support is arranged at a 10° angle below a horizontal plane.

7 Claims, 7 Drawing Sheets

HEAT EXCHANGER

BACKGROUND OF THE INVENTION

Exemplary embodiments of this invention generally relate to environmental control systems of an aircraft and, more particularly, to a recirculation heat exchanger of such an environmental control system.

Environmental control systems (ECS) for aircrafts and other vehicles are utilized to provide a conditioned airflow for passengers and crew within an aircraft. One type of environmental control system generally operates by receiving fresh air from a ram air intake located near the ECS equipment bay. The fresh ram air is supplied to at least one electric motor-driven air compressor that raises the air pressure to, for example, the desired air pressure for the cabin. From at least one air compressor, the air is supplied to an optional ozone converter. Because air compression creates heat, the air is then supplied to an air conditioning pack in which the air is cooled before being transported to the cabin.

The air exhausted from the cabin, also referred to as recirculation air, is provided to a recirculation heat exchanger where the air is cooled before being mixed with cool fresh air and returned to the cabin. As the size of aircraft cabins increase, the demands placed on the ECS also increase. A conventional ECS has difficulty meeting the greater cooling requirements of such an aircraft.

BRIEF DESCRIPTION OF THE INVENTION

According to one embodiment of the invention, a mount configured for use with a recirculation heat exchanger of an aircraft environmental control is provided including a rectangular base having a length of about 14 inches (35.56 cm) and a width of about 6 inches (15.24 cm). A support extends vertically from the base. A top surface of the support is arranged at a 10° angle below a horizontal plane.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
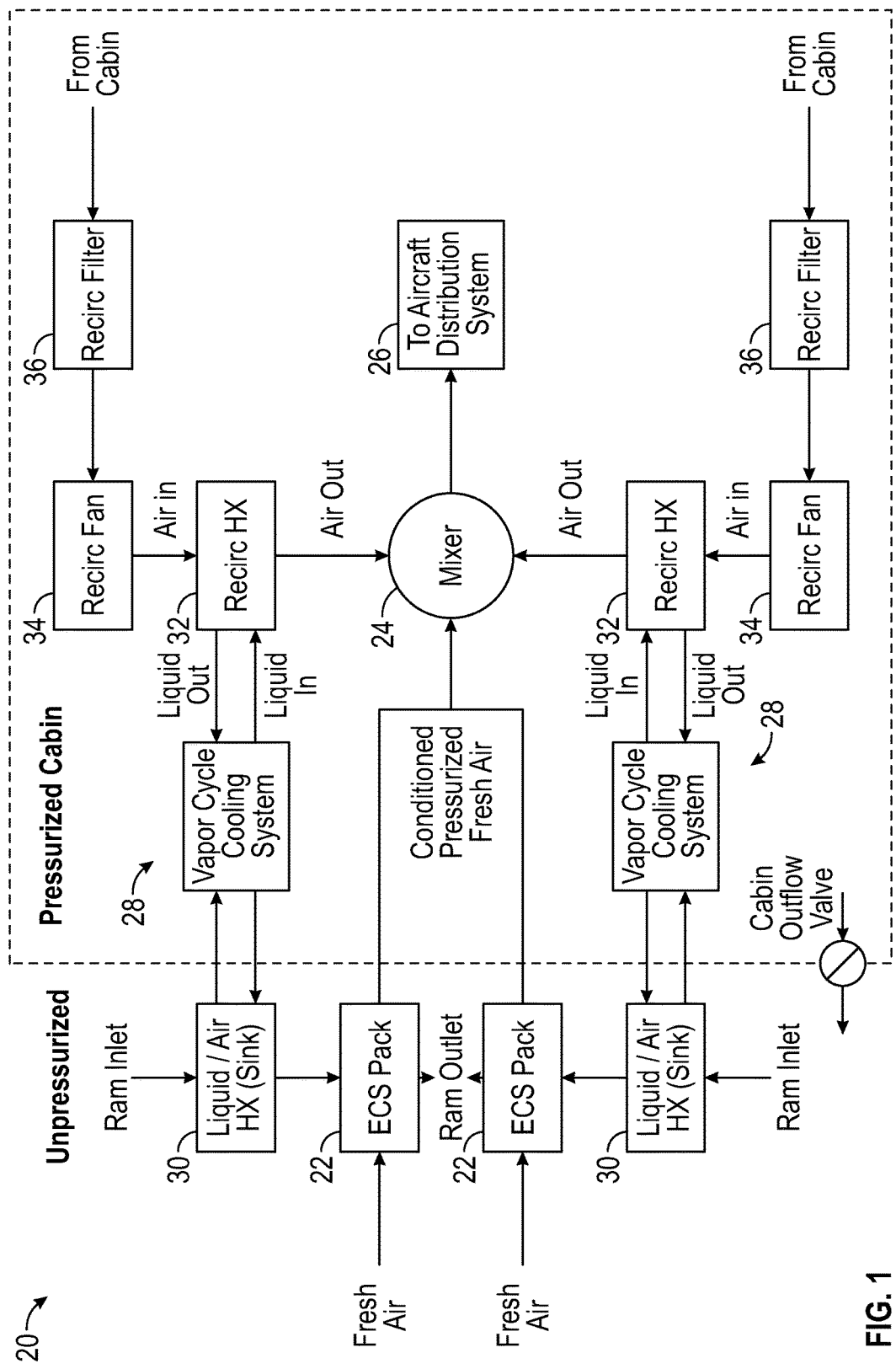
FIG. 1 is a schematic diagram of a portion of an environmental control system (ECS) of an aircraft.

Referring now to FIG. 1, a schematic diagram of an example of an environmental control system (ECS) 20 of an aircraft is illustrated in more detail. The ECS 20 is configured to receive air from both an exterior of the aircraft, as fresh ram air, and from the aircraft fuselage or another interior space as recirculation air. Fresh ram air is supplied to an ECS pack 22 including a plurality of conventional components including at least one heat exchanger (not shown). Within the ECS pack 22, the fresh air is conditioned via heat exchange with ram air such that cool pressurized air is provided to a downstream mixer 24 and then to an aircraft distribution system 26.

Before being provided to the ECS pack 22, the ram air is configured to pass through a heat exchanger 30 of a vapor cooling circuit 28. Within the heat exchanger 30, the ram air is configured to absorb heat, thereby cooling the liquid within the vapor cooling circuit 28. The vapor cooling circuit 28 additionally includes a recirculation heater exchanger 32.

A majority of the recirculation air is transferred from a cabin back to the ECS 20 using a recirculation fan 34. The recirculation fan 34 is configured to draw the recirculation air through a filter 36 before supplying the recirculation air to the recirculation heat exchanger 32 for cooling. The cooled recirculation air leaves the recirculation heat exchanger 32 and is then mixed with the fresh air being supplied to the aircraft distribution system 26.

Figure 2:
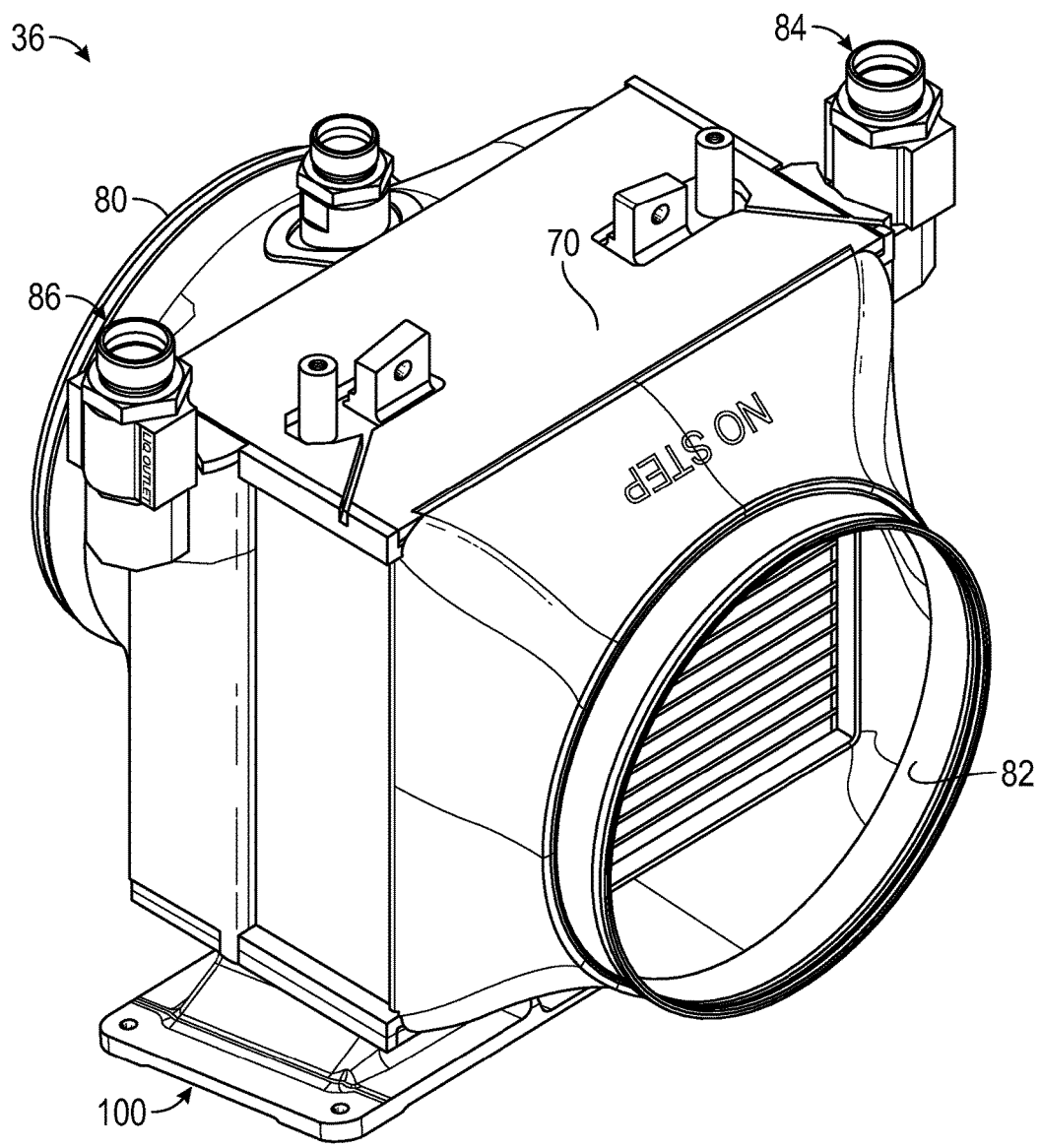
FIG. 2 is a perspective view of a recirculation heat exchanger of an ECS according to an embodiment.
Figure 3:
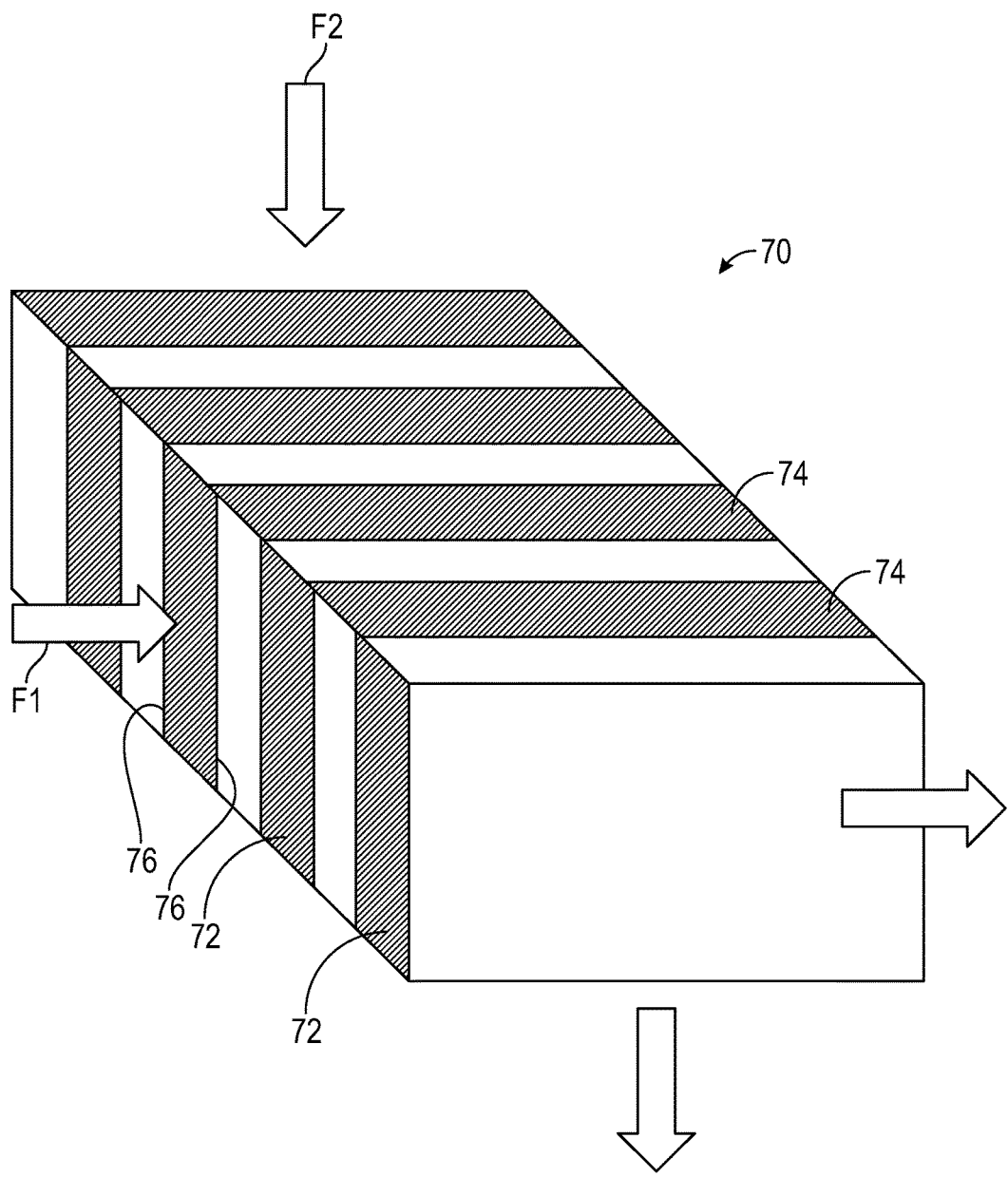
FIG. 3 is a perspective view of a core of the recirculation heat exchanger of FIG. 2 according to an embodiment.
Figure 4:
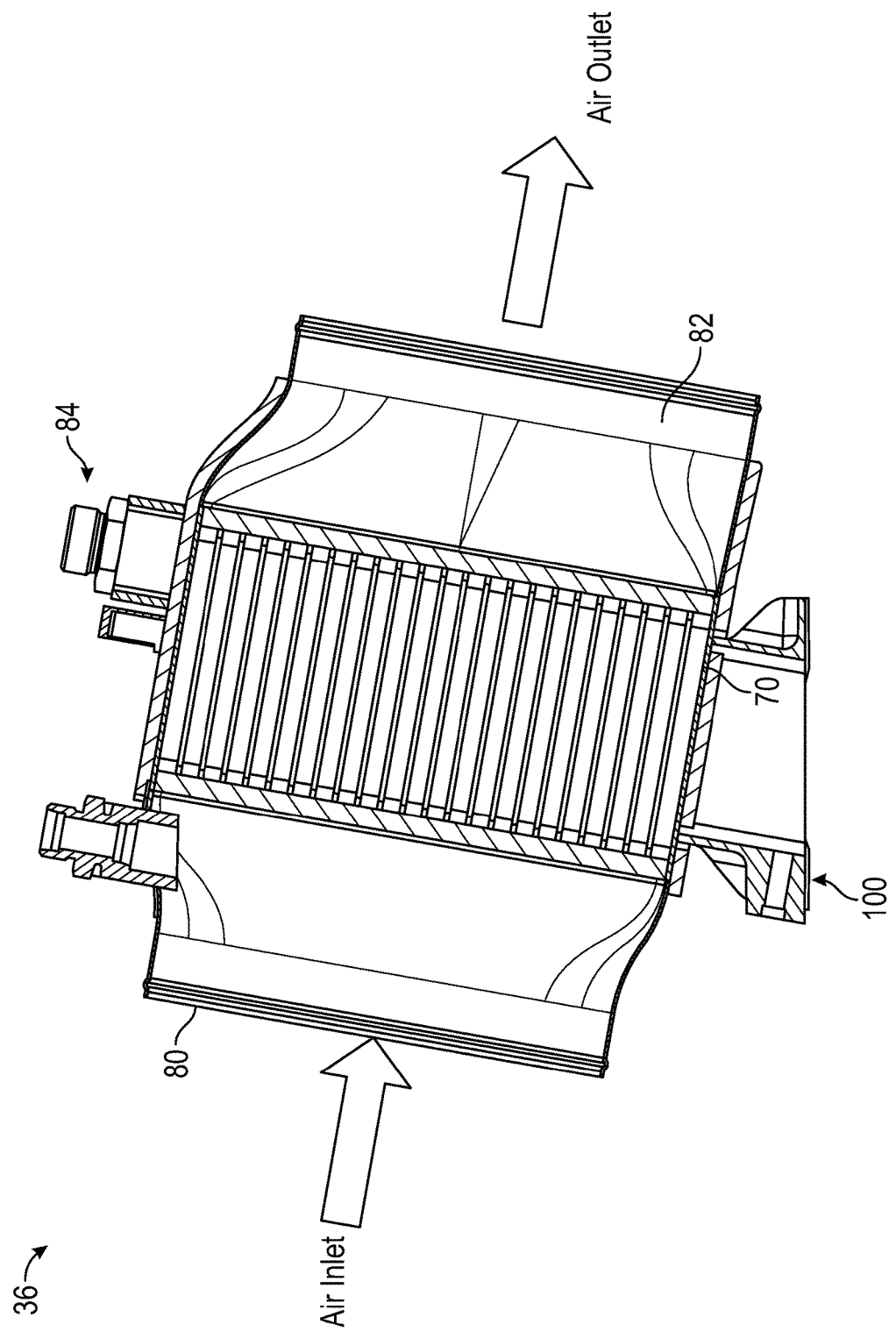
FIG. 4 is a cross-sectional view of the recirculation heat exchanger according to an embodiment.
Figure 5:
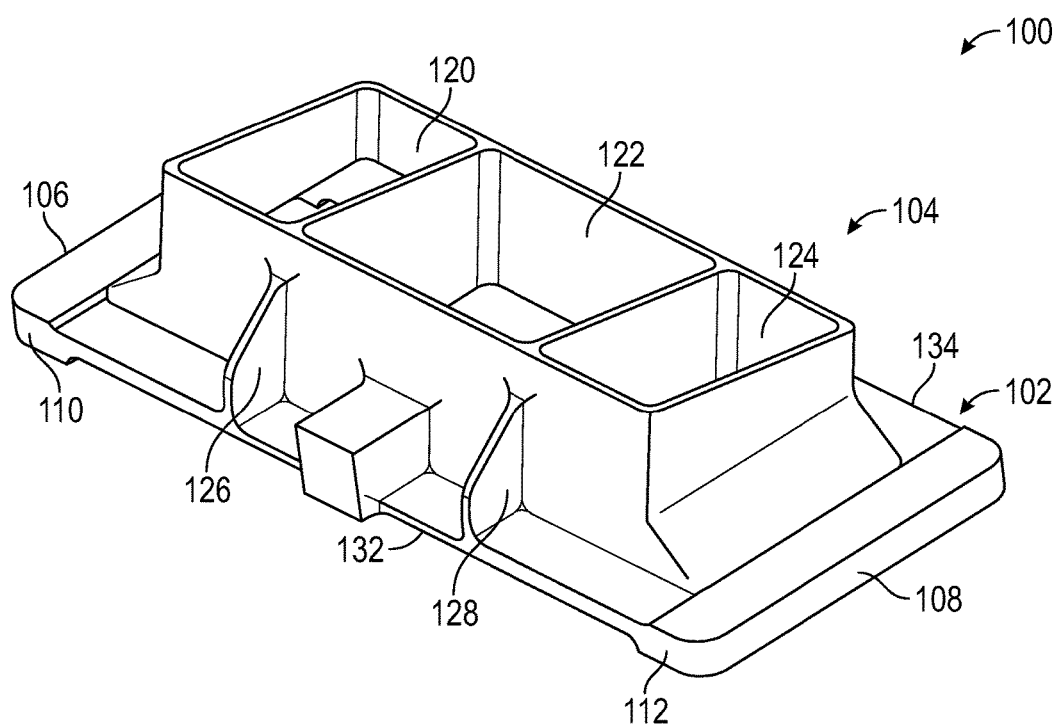
FIG. 5 is a perspective view of the mount supporting the recirculation heat exchanger according to an embodiment.
Figure 6:
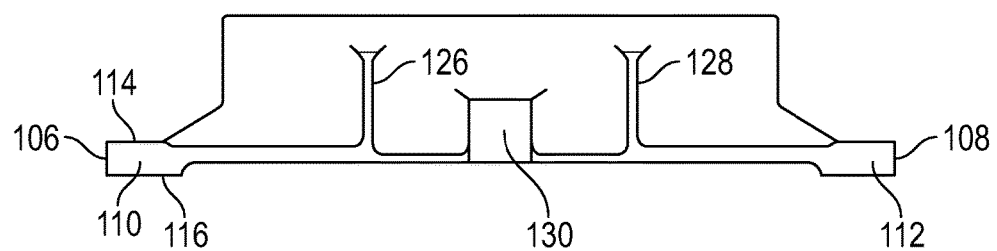
FIG. 6 is a front view of the mount of FIG. 5 according to an embodiment.
Figure 7:
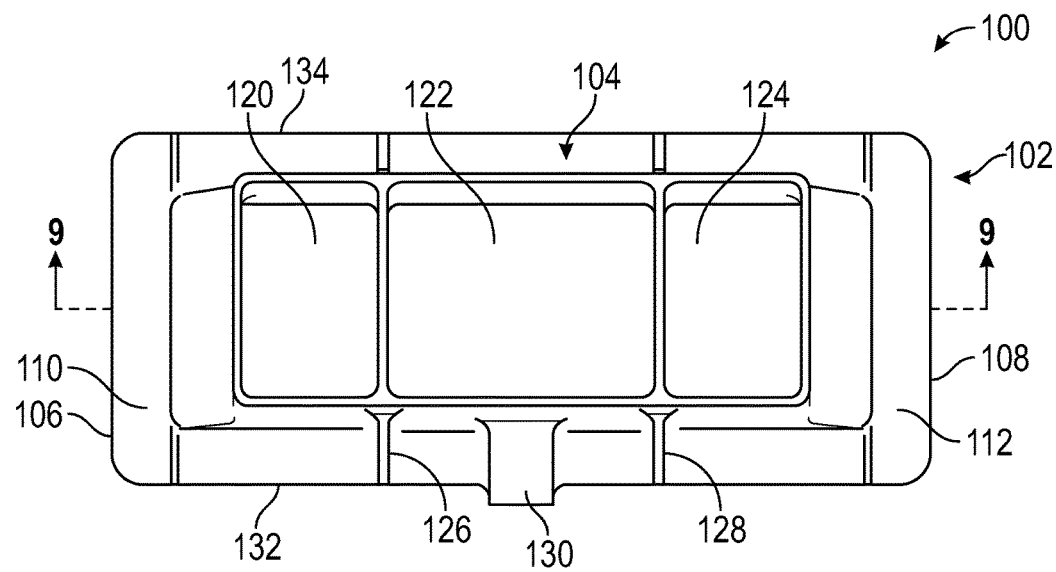
FIG. 7. is a top view of the mount of FIG. 5 according to an embodiment.
Figure 8:
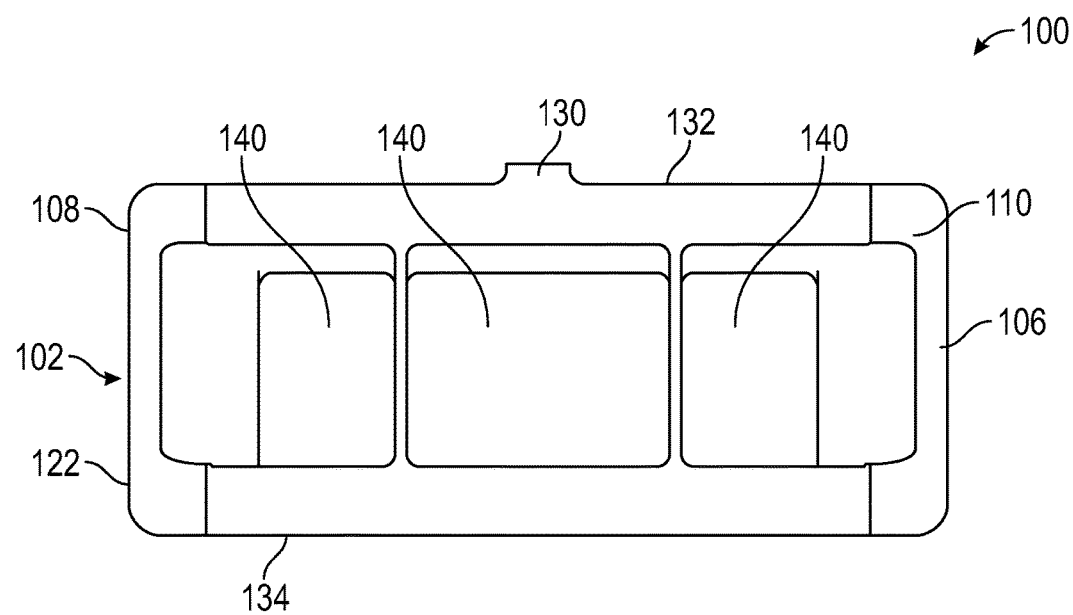
FIG. 8 is a bottom view of the mount of FIG. 5 according to an embodiment of the invention.
Figure 9:
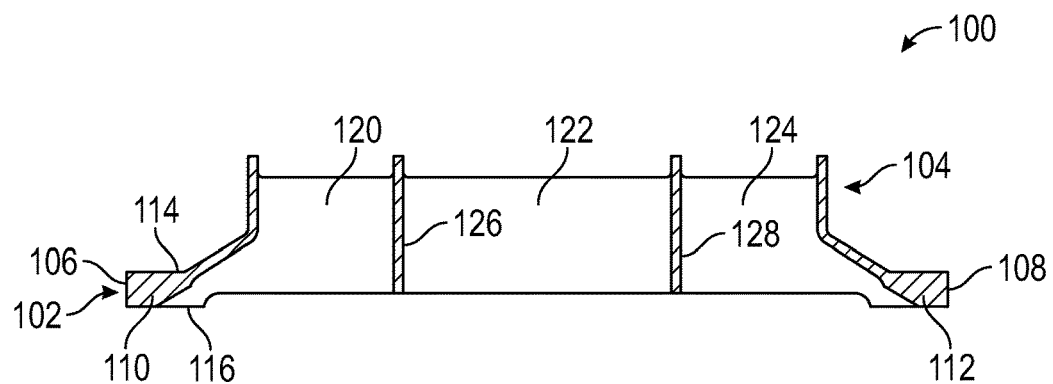
FIG. 9 is a cross-sectional front view of the mount of FIG. 7 taken along section D-D according to an embodiment.

Referring now to FIGS. 2 and 3, an example of a recirculation heat exchanger 32 is illustrated in more detail. The recirculation heat exchanger 32 is generally rectangular in shape and includes a core 70 having a plate-fin construction with crossflow of a first warm fluid (air) and a second cool fluid there through. The core 70 of the heat exchanger 32 includes a plurality of first fluid layers 72 and second fluid layers 74. The first fluid layers 72 have a fluid pathway defined by a plurality of corrugated fins such that a first fluid, such as warm recirculation air for example, flows through the core 70 in a first direction, indicated by arrow F1. The second fluid layers 74 have a fluid pathway defined by a plurality of corrugated fins such that a second fluid, for example a liquid coolant, flows through the core 70 in a second direction, indicated by arrow F2. It should be understood that other suitable fluids, such as a coolant for example, may be used as the second fluid to cool the recirculation air. In one embodiment, the direction of the second fluid flow is substantially perpendicular to the direction of the first fluid flow. The first and second fluid layers 72, 74 are alternately stacked to form the core. Thin plates 76 may separate adjacent fluid layers 72, 74.

An air inlet 80 and an air outlet 82 are arranged in fluid communication with the plurality of first fluid layers 72 of the core 70. Similarly, a liquid inlet 84 and a liquid outlet 86 are arranged in fluid communication with the plurality of second fluid layers 74 of the core 70 such that heat is configured to transfer from the recirculation air to the liquid within the heat exchanger 32. As illustrated, the air inlet 80 and the air outlet 82 are disposed adjacent opposite surfaces, such as a front and back of the core 70 for example.

However, in other embodiments, such as where the air flow within the heat exchanger 32 has a multi-pass configuration, the air inlet 80 and the air outlet 82 may be located adjacent the same surface of the core 70. Similarly, the liquid inlet 84 and the liquid outlet 86 illustrated in FIG. 2 are arranged adjacent opposing surfaces of the core 70, for example, a right side and left side of the core 70, respectively. However, in other embodiments, such as where the liquid flow path through the heat exchanger 32 has a multi-pass configuration, the liquid inlet 84 and liquid outlet 86 may be arranged on the same side of the core 70.

The recirculation heat exchanger 32 is attached to an adjacent structure in the distribution bay via a mount 100. The mount 100 may additionally provide an electrical connection to the aircraft structure for dissipation of static charge due to fluid flow through the heat exchanger 32. In one embodiment, the mount 100 may be formed via additive manufacturing, machining, or casting. Referring now to FIGS. 4-10, an example of the mount 100 is illustrated in more detail.

The mount 100 includes a generally rectangular base 102 having a rectangular support 104 protruding vertically upward from the base 102. The rectangular base 102 has a length of about 14 inches (35.56 cm) and a depth of about 6 inches (15.24 cm). In one embodiment, the corners of the rectangular base 102 are formed with a radius of about 0.500 inches (1.27 cm). The base 102 includes a left foot 110 formed adjacent a left side 106 of the base 102 and a right foot 112 formed at a right side 108 of the base 102, respectively. The left foot 110 and right foot 112 extend 0.2 inches (0.508 cm) in a first direction perpendicular to a horizontal plane and 0.375 inches (0.9525 cm) in a second, opposite direction perpendicular to the horizontal plane. A length of the top surface 114 of each foot 110, 112 is about 1.025 inches (2.6035 cm) and a length of a bottom surface 116 of each foot 110, 112 is about 1.300 inches (3.302 cm). As suggested, the bottom surface 116 of feet 110, 112 is longer than the top surface 114 of the feet 110, 112 such that a distance between the right side 108 of the base 102 and the nearest side of the top surface 114 of the left foot 110 is about 12.975 inches (32.957 cm) and a distance between the right side 108 of the base 102 and the nearest side of the bottom surface 116 of the left foot 110 is about 12.700 inches (32.258 cm).

The corners of the rectangular support 104 may be rounded to have a radius of about 0.250 inches (0.635 cm). The hollow interior of the support 104 is divided into a plurality of sections, for example a first section 120, second section 122, and third section 124, by a first web 126 and a second web 128. In one embodiment, the distance between the right side 108 of the base 102 and the closest surface of the support 104 arranged parallel to the right side 108 is about 2.075 inches (5.271 cm). A distance from the right side 108 of the base 102 to the opposite surface of the support 104 arranged parallel to the right side 108 is about 11.925 inches (30.290 cm).

As shown, a portion of each web 126, 128 may extend outside of the rectangular support 104 and interface with the rectangular base 102 on one or both sides of the support 104. In the illustrated, non-limiting embodiment, the webs 126, 128 are integrally formed with both the base 102 and the support 104. In one embodiment, illustrated in FIG. 7, a distance between the right side 108 of the base 102 and an adjacent surface of the first web 126 is about 9.293 inches (23.604 cm), and a distance between the right side 108 of the base 102 and an adjacent surface of the second web 126 is about 4.557 inches (11.575 cm). A tab 130 may be positioned at the interface between the base 102 and the support 104. The tab may near a center of the mount 100, between the webs 126, 128, such that a distance between the right side 108 of the base 102 and a far side of the tab 130 is about 7.562 inches (19.207 cm) and the distance between the right side 108 of the base 102 and a near side of the tab 130 is about 6.438 inches (13.653 cm). The tab 130 protrudes beyond a front surface 132 of the base 102 such that an overall depth from the back surface 134 of the base 102 to the far side of the tab 130 is 6.350 inches (16.129 cm). An overall height of the tab 130 may be about 1.125 inches (2.575 cm).

The thickness of the base 102 is configured to vary over the length of the base 102. In one embodiment, the thickness between a foot 110, 112 and an adjacent web 126, 128 is about 0.300 inches (0.762 cm). In addition, a radius of about 0.300 inches (0.762 cm) may be formed between the top surface 116 of the left foot 110 and an adjacent portion of the base 102. Similarly, a radius of about 0.125 inches (0.3175 cm) may be formed between the top surface 116 of the right foot 112 and an adjacent portion of the base 102. To reduce material and weight, a plurality of openings 140 are formed in the lower surface of the base 102. The openings 140 are fluidly coupled to the hollow sections 120, 122, 124 of the support 104 and are substantially aligned with each other. The openings 140 are positioned such that a first side of the openings 140 is arranged at a distance of about 1.207 inches (3.066 cm) from the back side of the base 102 and a second side of the openings is located at a distance of about 4.964 inches (12.609 cm) from the back side 134 of the base 102.

Figure 10:
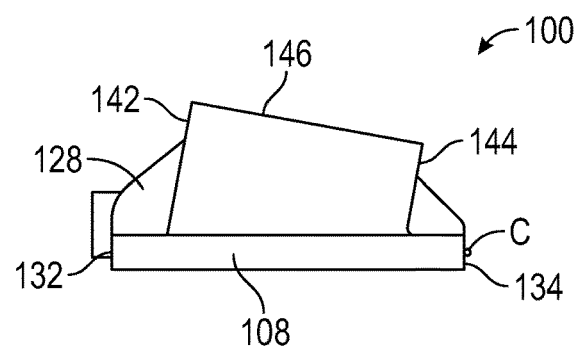
FIG. 10 is a side view of the mount of FIG. 5 according to an embodiment.
Figure 11:
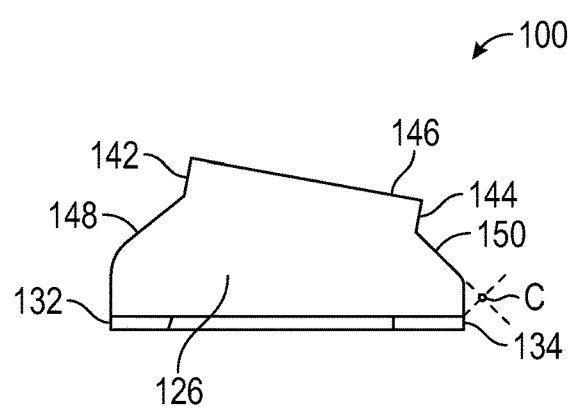
FIG. 11 is a cross-sectional side view of the mount of FIG. 6 taken along section E-E according to an embodiment.

As is visible in FIGS. 10 and 11, the front 142 of the support 104 is taller (vertically) than a rear 144 of the support 104. The horizontal plane A of the base 102 intersects the plane B defined by the rear surface 134 of the base 102 at a point C. The rear surface 144 of the support 104 is arranged at a distance of about 1.308 inches (2.637 cm) from a parallel plane containing point C. Similarly, the front surface 142 of the support 104 is located a distance of about 5.038 inches (12.797 cm) from a parallel plane containing point C. A plane parallel to the top surface 146 of the support 104 is arranged at an angle of about 10° relative to the horizontal plane A. The distance between the top surface 146 of the support 104 and the plane parallel to the top surface 146 and containing point C is about 1.820 inches (4.623 cm). A plane parallel to the upwardly angled portion 148 of web 126, illustrated in FIG. 11, is arranged at an angle of about 49.94° relative to the plane of the rear surface 134. The distance between the upwardly angled portion of web 148 and a plane parallel thereto and containing point C is about 4.626 inches (11.750 cm). The upwardly angled portion 148 of the web 126 may extend from a radius of about 0.750 inches (1.905 cm). The upwardly angled portion 150 of web 126 is arranged at a distance of about 0.424 inches (1.077 cm) from a parallel plane containing point C. The upwardly angled portion 150 of web 126 may extend from a radius of about 0.500 inches (1.27 cm).

The intersection between the base 102 and the support 104 includes a member 150 extending at an angle there between. In one embodiment, the member 150 extends at an angle of about 33° relative to the horizontal plane A of the base 102.

A plane oriented parallel to the member 150 includes the point formed at the intersection between the interior surface of the member 150 and the lower surface 116 of the right foot 112. The inner surface of the member 150 arranged adjacent the left side 106 of the base 102 is laterally offset from this plane by a distance of about 7.110 inches (18.059 cm). An outer surface of the member 150 arranged adjacent the left side 106 of the base 102 is laterally offset from this plane by a distance of about 7.332 inches (18.623 cm).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mount configured for use with a recirculation heat exchanger of an aircraft environmental control system, comprising:
   a rectangular base having a length of about 14 inches (35.56 cm) and a width of about 6 inches (15.24 cm); and
   a support extending vertically from the base and defining a vertical extent of the mount, wherein a topmost surface of the support is a topmost surface of the mount and is non parallel to a bottommost surface of the base, the support configured to receive a recirculation heat exchanger;
   wherein the base includes a left foot arranged adjacent a left side thereof and a right foot adjacent a right side thereof, each of the feet extending 0.200 inches (0.508 cm) perpendicular to a horizontal plane in a first direction and 0.375 inches (0.9525 cm) perpendicular to a horizontal plane in a second, opposite direction, the left foot and right foot having an upper surface with a length of about 1.025 inches (2.6035 cm) and a lower surface with a length of about 1.300 inches (3.302 cm), each of the feet extending horizontally along the entire width of the base;
   wherein a hollow interior of the support is divided into a first section, second section, and third section by a first web and a second web, wherein a distance between the right side and an adjacent surface of the first web is about 9.293 inches (23.604 cm) and a distance between the right side and an adjacent surface of the second web is 4.557 inches (11.575 cm); and
   wherein one or more of the first web and the second web extend from inside of the support through a support wall to outside of the support.

2. The mount according to claim 1, wherein one or more corners of the base have a radius of about 0.500 inches (1.27 cm) and one or more corners of the support have a radius of about 0.250 inches (0.635 cm).

3. The mount according to claim 1, wherein a distance from a right side of the base to the upper surface of the left foot is about 12.975 inches (32.957 cm) and a distance from a right side of the base to the lower surface of the left foot is about 12.7000 inches (32.258 cm).

4. The mount according to claim 1, wherein at least one opening is formed in the lower surface of the base, the at least one opening being positioned such that a first side is arranged at a distance of about 1.207 inches (3.066 cm) from a back side of the base, and a second side is arranged at a distance of about 4.964 inches (12.609 cm) from the back side of the base.

5. The mount according to claim 1, wherein the right side of the base is arranged at a distance of about 2.075 inches (5.271 cm) from an adjacent surface, of the support and a distance of about 11.925 inches (30.290 cm) from an opposite surface of the support.

6. The mount according to claim 1, wherein the horizontal plane intersects a rear surface of the base at a point, a front surface of the vertical support being arranged at a distance of about 5.038 inches (12.797 cm) from a parallel plane containing the point, a rear surface of the vertical support being arranged at a distance of about 1.038 inches (2.636 cm) from a parallel plane containing the point, and a top surface of the vertical support being arranged at a distance of about 1.820 inches (4.623 cm) from a parallel plane containing the point.

7. The mount according to claim 6, wherein a first angled surface of the first web is arranged at a distance of about 4.626 inches (11.750 cm) from a parallel plane containing the point, the first angled surface extending from a radius of about 0.750 inches (1.905 cm) at an angle of about 49.94° relative to vertical, a second angled surface of the first web is arranged at a distance of about 0.424 inches (1.077 cm) from a parallel plane containing the point, the second angle surface extending from a radius of about 0.500 inches (1.27 cm).

* * * * *